June 11, 1946.  W. E. REYNOLDS  2,401,962
MEASURING INSTRUMENT
Filed April 8, 1943
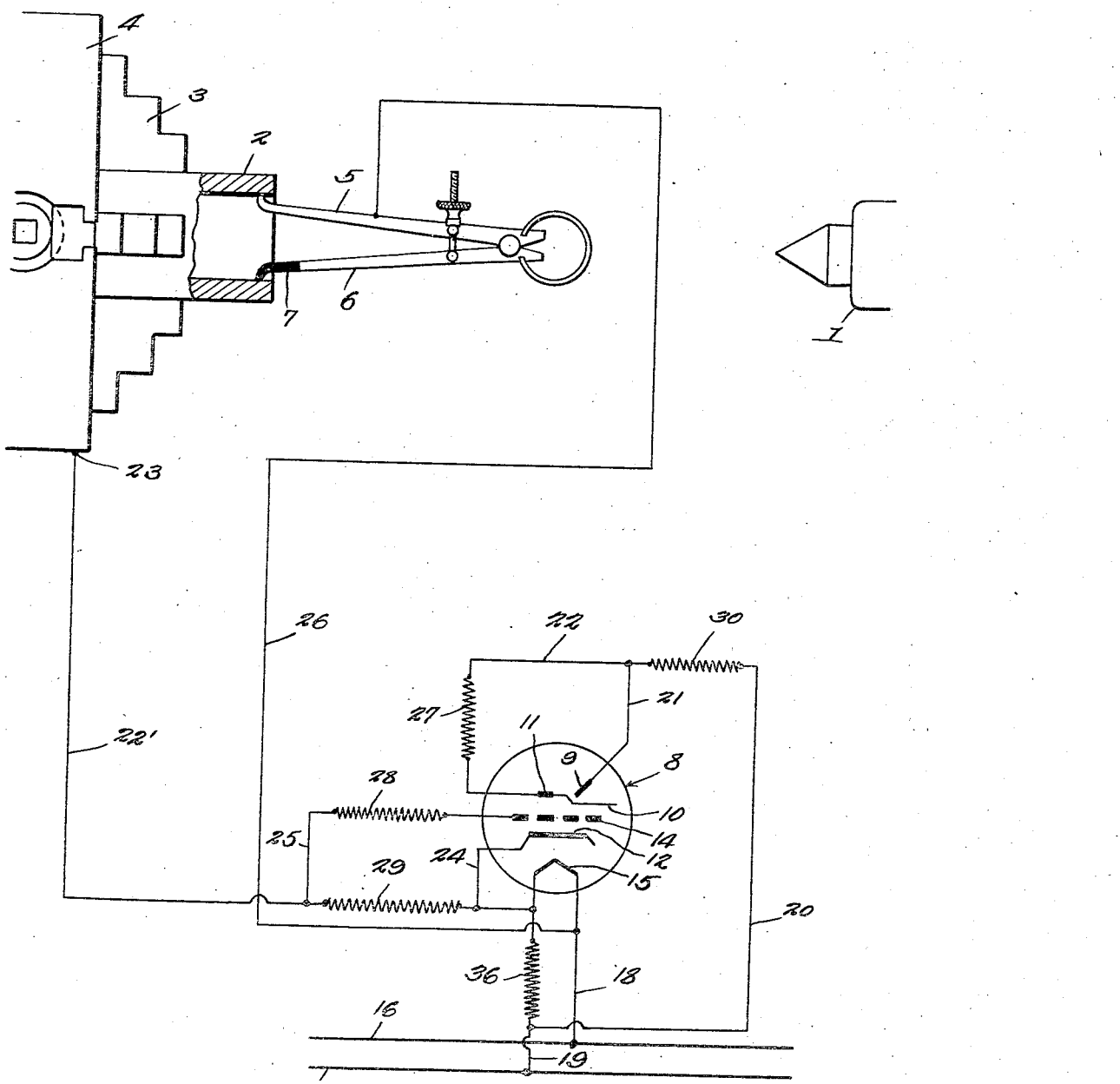
W. E. Reynolds
INVENTOR.
BY *Knowles*
Atty.

Patented June 11, 1946

2,401,962

UNITED STATES PATENT OFFICE 2,401,962

MEASURING INSTRUMENT

William Elmer Reynolds, Coquille, Oreg.

Application April 8, 1943, Serial No. 482,305

1 Claim. (Cl. 177—311)

This invention aims to provide a distance-measuring device embodying novel means whereby an electron-ray tube of the visible indicator type may be employed to give a visible signal when the parts of a pair of calipers, micrometer or the like, come into contact with an object, it being unnecessary to rely on the sense of touch.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawing, a single diagrammatic figure depicts a device constructed in accordance with the invention.

The numeral 1 marks the tail spindle of a lathe, and at 2 there appears a tubular object which is chucked at 3 upon the rotatable member 4 of the lathe. Let it be supposed that it is desired to ascertain the diameter of the bore of the object shown at 2, although the device hereinafter described may be used for measuring other distances, and may be employed elsewhere than on a lathe.

A distance gauge is employed, and is shown as a pair of calipers comprising legs 5 and 6, made of conducting material, the leg 6 carrying insulation 7 at its working end. The distance gauge need not be a pair of calipers and the calipers or its equivalent constitutes a portable switch. It may be any suitable instrument comprising relatively movable members capable of taking off a distance, the working part of one member being a conductor of electricity, and the working part of the other member being a non-conductor, such a description being broad enough to read on a micrometer gauge, for example.

The drawing shows an electron-ray tube 8 of the high-vacuum type and capable of indicating visibly the effect of change in the controlling voltage. For different controlling voltages, the shaded pattern produced on the fluorescent target 9 varies ordinarily through an arc of approximately ninety degrees. The extent of the shaded area is governed by the voltage on the ray-control electrode 10, which is an extension of the triode plate 11 that is disposed between the cathode 12 and the target 9.

The voltage on the ray-control electrode 10 is determined by the voltage applied to the grid 14 of the triode. A decrease in triode grid bias decreases the voltage on the ray-control electrode 10, and an increase produces an increased voltage on the ray-control electrode. The heater appears at 15.

The mains are indicated at 16 and 17 and are connected, respectively, at 18 and 19, with the pins of the heater 15. The mains supply, preferably a 110 volt current, D. C. or A. C. A conductor 20 is joined to the connection 19, and therefore to the main 17, the conductor having (diagrammatically considered) a branch 21 for the target 9, and a branch 22 for the plate 11.

A conductor 22' is jointed to the connection 19, and is grounded in any suitable way, for instance as shown at 23 on the lathe or other machine wherewith the device is used. The cathode 12 is joined at 24 to the conductor 22', and the grid 14 is joined at 25 thereto. A conductor 26 extends between the connection 18 and the conducting leg 5 of the calipers, or to some corresponding part of an instrument functioning like a pair of calipers but differing structurally therefrom. The pins of the tube 8 of course operate in the usual way in bringing in the tube properly.

The conductor 19 embodies a line load resistor 36, preferably of about 360 ohms. The branch 22 embodies a plate resistor 27 preferably of about one megohm, causing high potential on the plate 11. The conductor 26 embodies a resistor 28, and the conductor 22' embodies a resistor 29, the parts specified serving to bias grid negative sufficiently with respect to the cathode 12 so as to cut plate current, and the target 9 will show fluorescent throughout.

When the legs 5 and 6 of the calipers (if a pair of calipers happens to be the instrument selected) come into contact with the object 2, the grid 14 of the tube 8 is made positive with regard to the anode and the target 9, plate current flows, and a shadow appears on the target. The shadow comes on the target 9 the instant that contact with the object 2 by the calipers or equivalent device. The operator experiences no sense of touch and does not have to proceed by the sense of touch, the measurement being made with a high degree of perfection and uniformity.

The resistor shown at 30 in the conductor 22 is a small stabilizing resistor which takes out some of the A. C. ripple and causes the tube 8 to operate with a clear-cut shadow.

What is claimed is:

A tube and tube-circuit structure for use in making pressureless micrometric measurements, including a tube comprising a heater, a cathode, a grid, a triode plate having an extension forming a ray-control electrode, and a target, an electrical circuit including the heater and including a ground forming one side of the circuit, a connection between the plate and said circuit, a connection between the circuit and the cathode, a connection between the circuit and the grid, the two last-specified connections having resistances of such degree as to bias grid negative sufficiently with respect to the cathode so as to cut plate current and to cause the target to show fluorescent throughout and a portable switch comprising electrically - connected relatively - movable members for engagement with spaced portions of the ground, one of said members being a conductor, and the other of said members being an insulator, one of said members forming the other side of the circuit.

WILLIAM ELMER REYNOLDS.